Sept. 9, 1941.   R. W. BAILY   2,255,344
APPARATUS FOR CONSOLIDATING PLASTIC MATERIALS BY MEANS
OF INTERNALLY APPLIED VIBRATIONS
Original Filed May 14, 1934   2 Sheets-Sheet 1
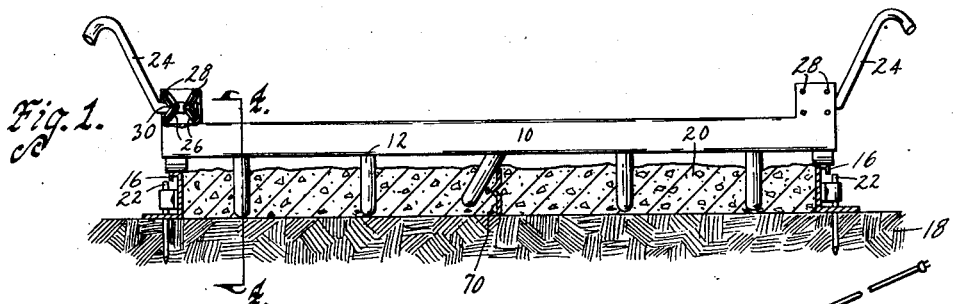
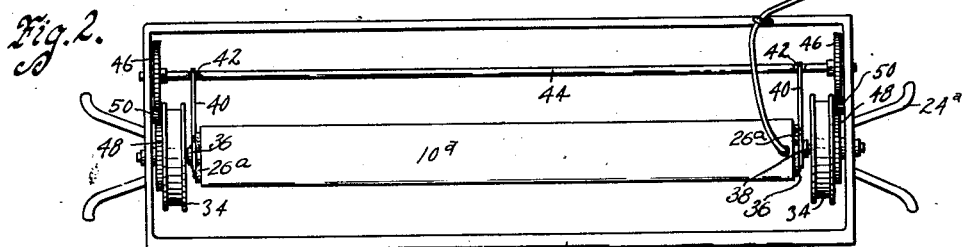
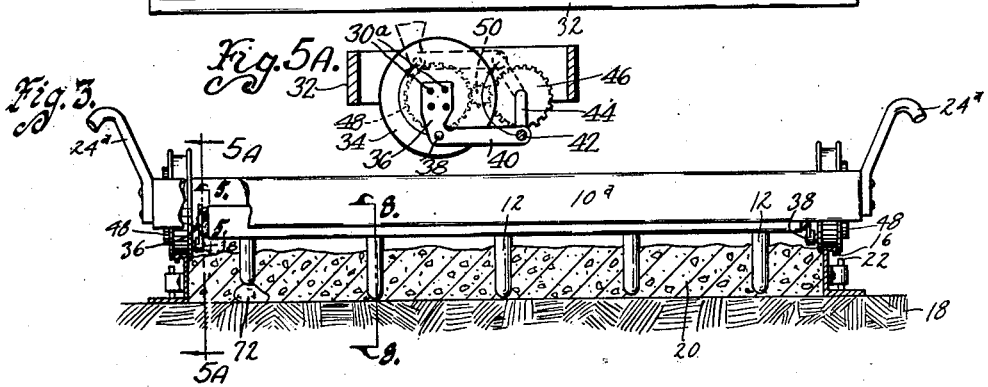
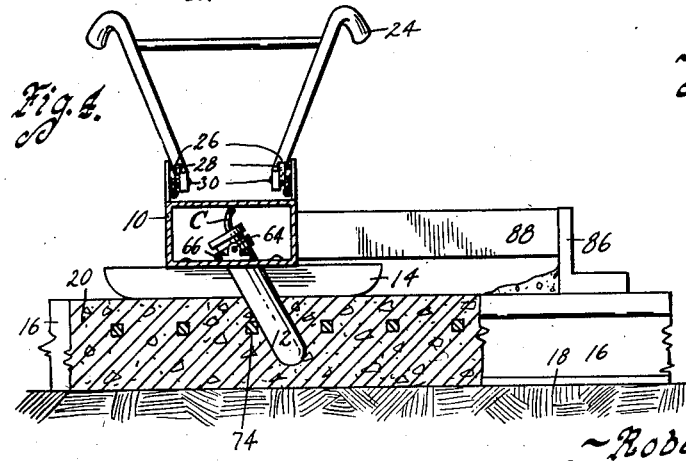
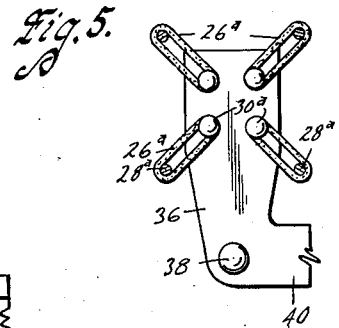

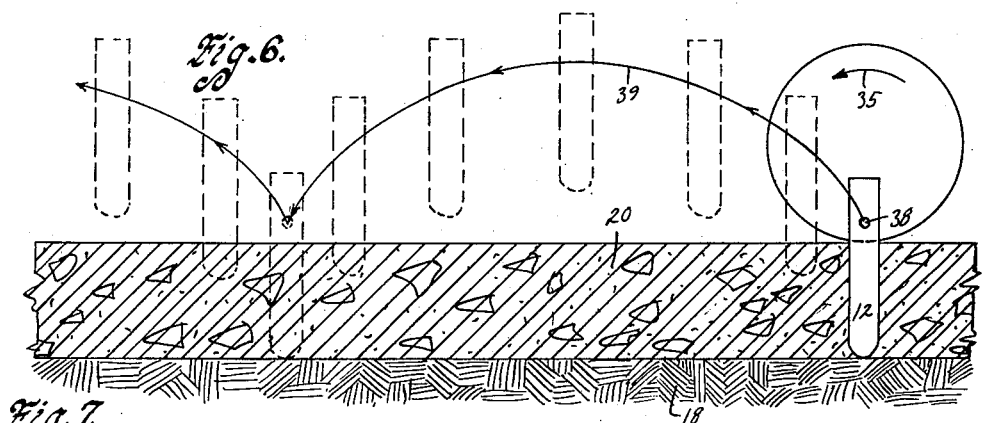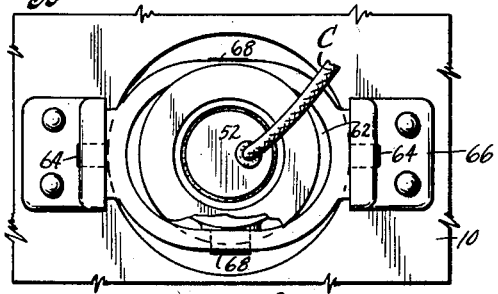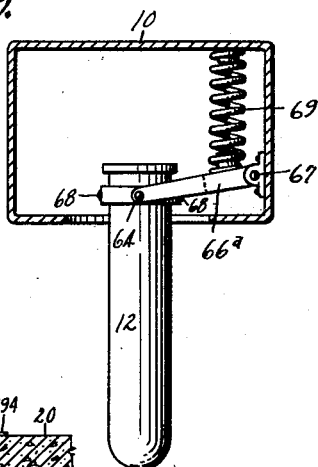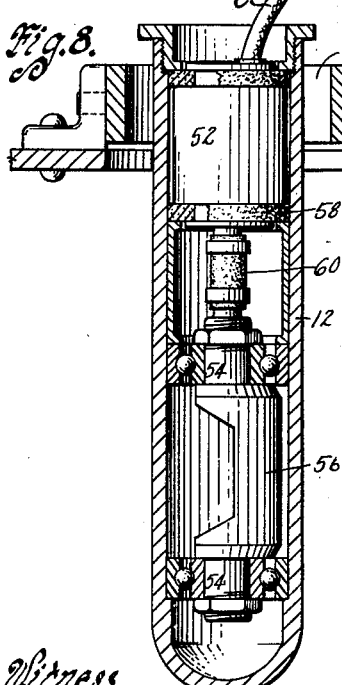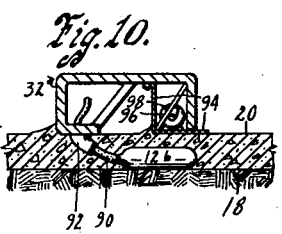

Patented Sept. 9, 1941

2,255,344

UNITED STATES PATENT OFFICE 2,255,344

APPARATUS FOR CONSOLIDATING PLASTIC MATERIALS BY MEANS OF INTERNALLY APPLIED VIBRATIONS

Robert William Baily, Narberth, Pa.

Continuation of application Serial No. 725,580, May 14, 1934. This application September 6, 1938, Serial No. 228,625

8 Claims. (Cl. 94—48)

An object of my invention is to provide a method of consolidating plastic materials by means of internally applied vibrations and an apparatus of simple, durable and inexpensive construction for practicing the method.

Another object is to provide a method and apparatus for consolidating plastic materials by subjecting spaced points thereof to internally applied vibrations by means of a supporting member having a plurality of vibrators depending therefrom, the supporting member being movable to successive positions for subjecting the entire mass of a pavement or the like to the vibrations inasmuch as the concrete while still plastic and before initial set has occurred will be vibrated at considerable distance from the points at which the vibrating elements are inserted.

More particularly, it is my object to provide a method for treating plastic material used for pavements and various other purposes, consisting of the subjection of the interior of the mass of material to vibrations imparted to it by a plurality of vibrating mechanisms functioning at imbedded positions in the plastic material.

Another object is to provide suitable apparatus including vibrating mechanisms adapted to be inserted into and drawn from or through the mass of plastic material so as to subject the same at suitable intervals to vibrations and thus result in properly consolidating the entire mass.

With these and other objects in view my method consists in the steps hereinafter designated and my apparatus consists in the construction, arrangement and combination of the various parts thereof, whereby the objects contemplated are attained, as set forth more in detail in my specification, pointed out in my claims and illustrated in the accompanying drawings, in which, Figure 1 is a front elevation of one form of my apparatus for consolidating plastic materials by means of internally applied vibrations.

Figure 2 is a plan view of a slightly modified form of the invention.

Figure 3 is a front elevation of the form shown in Figure 2.

Figure 4 is a sectional view on the line 4—4 of Figure 1 showing the parts on an enlarged scale.

Figure 5 is an enlarged sectional view on the line 5—5 of Figure 3, showing a vibration elimination connection.

Figure 5A is a sectional view on the line 5A—5A of Figure 3.

Figure 6 is a diagrammatic view of the form of invention shown in Figures 2 and 3 and showing its action during operation.

Figure 7 is a plan view of one of the vibrating elements.

Figure 8 is a vertical sectional view of the same, as taken on the line 8—8 of Figure 3.

Figure 9 is a similar sectional view showing a different mounting for the vibrating element.

Figure 10 is a sectional view of another modified form of the invention.

This application has the same disclosures as Baily Serial No. 114,877, which matured as Patent No. 2,180,660 on November 21, 1939, and which was a continuation of and disclosed the subject-matter of Baily application Serial No. 725,580, filed May 14, 1934.

In making concrete pavements and concrete foundations for other wearing surfaces, the concrete is ordinarily placed upon the subgrade to such a depth that when struck off by a screed or planer, it will have the desired elevation and contour. Various methods have been used to consolidate the concrete. Frequently a screed or planer with substantially vertical front face is drawn over the concrete. Usually the screed rests upon the side forms.

This screed imparts to the concrete at the surface a slight kneading or working action which quite often produces a surface of pleasing appearance, but which does not beneficially affect the major portion of the concrete below its surface.

Due, however, to the inertia or dead weight of the concrete, the force of the tamping blows is absorbed by the upper portion of the concrete, with the result that the lower portion of the mass is not beneficially affected.

Other methods more efficacious than the two above described consist in vibrating the screed, or in passing over the surface a vibrating roller. Some methods agitate the concrete mass to its full depth, but due to the fact that in some cases the vibratory energy is applied to the concrete mass at its upper surface, some ill effects have been observed.

When the vibratory energy is applied to the surface of the concrete mass, the major portion of the agitation occurs in the upper part of the mass, and when enough energy is applied to produce sufficient agitation in the lower portion, the excess energy applied to the upper portion tends to bring to the surface various impurities, such as inert and non-cementitious materials, producing a condition called laitance. This produces a surface skin which is weak and tends to scale off, leaving the concrete surface rough and imperfect.

One object of my present invention is to provide a method and means for agitating the entire mass to its full depth over a shorter period of time, thus providing less opportunity for these impurities to rise to the surface.

I have found that by applying the vibratory energy to the interior of the mass of material, at closely spaced locations and to the full depth of the mass the concrete thereby receives uniform vibrating treatment through its full depth, eliminating all voids, expelling entrapped air and surplus water, and giving to the mass of concrete the maximum degree of density and resistance to the infiltration of moisture without causing the undesired impurities to rise to its surface.

By my present method and apparatus, I can apply vibration within the mass of concrete by inserting, at closely spaced intervals and to the full depth of the mass, vibratory units.

I shall now describe illustrative types of apparatus which may be utilized for my purpose and then explain in greater detail the manner of practicing my method, although I may accomplish the same purpose with other forms of vibratory units and with modifications in the manner of their application to the plastic mass to be treated.

In Figure 1, I show a supporting member 10. It is of box-like construction and my subsequent description of Figures 4 and 8 apply to it and to vibrating elements 12 depending therefrom. The supporting member 10 is provided with runners or the like 14 adapted to travel on side forms 16 of a subgrade 18 or other fixed means associated with the material 20 adapted to support parts 14 at a predetermined level. Suitable hold down rods 22 are associated with the side forms to retain them in position in the ordinary manner. Concrete or other plastic material 20 is illustrated between the side forms. The concrete deposited between the side forms is initially roughly leveled off. The supporting member 10 spans the concrete between the side forms 16.

The member 10 is provided with manipulating handles 24, preferably attached to the supporting member by rubber bands or the like 26 associated with pins 28 of the supporting member and pins 30 of the handles 24. This method of attachment prevents transmission of vibrations from the supporting member 10 to the handles 24 and is shown more in detail in my Patent No. 2,018,294 issued October 22, 1935.

The supporting member 10 and its vibrating elements 12 can be raised and lowered, moved longitudinally of the roadway, or be otherwise manipulated by the handles 24.

The vibrating elements 12 are so carried by the supporting member 10 that they may penetrate into the plastic mass 20 to any desired depth, preferably the full depth of the plastic mass as indicated.

In Figures 2 and 3, I show a supporting member 10a having the vibrating elements 12 depending therefrom. A frame 32 is provided having wheels 34, providing a carriage for the supporting member 10a. Handles 24a are secured to the carriage, but need not be provided with the connections 26, 28, and 30 as the supporting member 10a is provided with such connections between it and the carriage as will now be described.

A supporting plate 36 (see Figs. 5 and 5A) is provided for each end of the supporting member 10a. Pins 28a, extending from the member 10a and pins C extending from the plate 36, together with 30a rubber bands 26a, are provided as a means of connection between the supporting member 10a and the supporting plates 36. Each plate 36 is pivoted on a crank pin 38 and the crank pins are mounted off center on the carriage wheels 34 as best shown in Figure 5A. The plates 36 are provided with arm-like extensions 40 which are pivoted on crank pins 42 of a crank shaft 44. The crank shaft 44 has the throw of its crank pins equal to the distance off center of the pins on the carriage wheels 34, is suitably journaled relative to the frame 32 and is geared by gears 46 and 48 and idler pinions 50 to the carriage wheels for rotation in the same direction and at the same speed so as to remain level (illustrated by a dotted line position in Fig. 5A) in all positions of rotation of the carriage wheels 34 and thereby keep the supporting member 10a level at all times.

The vibrating elements 12 are preferably universally hung relative to the supporting members 10 and 10a. I have shown this arrangement more in detail in Figures 7 and 8 wherein the vibrating element will be observed as a casing within which is mounted an electric motor 52 and a vibrator shaft 54 having an off center weight 56. Rotation of the shaft 54 will cause vibration of the casing in a substantially horizontal plane when the motor is energized. The motor is mounted in resilient rings 58 of rubber or the like and has a flexible connection 60 with the shaft 54 so that the transmission of vibrations of the weight 56 to the motor is minimized. The conductor C conducts power from a source, not shown, to the revolving weight 56 in the housing 12.

As a means of universal mounting, I have shown a ring 62 for each vibrating element 12 pivoted on a horizontal axis by means of pintles 64 mounted in brackets 66 secured to the bottom of the box-like supporting element 10 or 10a. The ring 62 in turn supports pintles 68 of the vibrating element 12 which are arranged on a normally horizontal axis at right angles to the axis of the pintles 64.

By the universal mounting just described, it will be obvious that the vibrating elements 12 will normally depend downwardly into the concrete mass 20, but can be deflected sidewise away from a center joint or the like shown at 70 in Figure 1, or may be deflected rearwardly during travel of the carriage, or to pass over rocks 72 or other obstructions as shown in Figure 3 (left end). In Figure 4, I have shown how they may be deflected to avoid interference with reinforcing bars 74.

I provide an alternative mounting which will permit the supporting ring 62 to be moved upwardly for permitting the vibrating element 12 to clear obstructions by the construction shown in Figure 9. A forked arm 66a is pivoted at 67 on the support 10, and has its spaced arms pivoted to the ring 68. A spring 69 holds the arm 66a normally in its lower position, but it can be raised relative to the supporting member 10 or 10a when the vibrating element strikes an obstruction.

In combination with the vibrating elements, a screed or planer 86 may be provided either connected as by a frame 88 with the supporting member 10 or independent of the vibrating element support. Thus after the concrete is compacted by the vibrating elements, it is leveled off to the desired contour by the screed 86.

In Figure 10, I have shown another form of the invention including a frame 32a and vibrating elements 12b supported thereon by flexible connecting tubes 90 extending from elbows 92. The elbows 92 plow through the plastic material 20, permitting the vibrating elements 12b to trail therebehind and assume positions entirely imbedded in the plastic material and adjacent the subgrade.

In connection with either form of the invention, a screed plate 94 may be provided having a vibrator motor 96 and a vibrator weight 98 for vibrating it and thereby subjecting the surface of the concrete to vibrations as it is struck off by the plate 94.

When the vibrating elements 12 are operated within the plastic material 20, the energy from each element affects the plastic mass to a considerable distance in every direction. The elements are sufficiently close together so that the area each affects overlaps the areas affected by the adjacent elements, thus providing adequate vibration for the entire mass of the plastic material 20.

When the apparatus is positioned as shown in Figure 1, it will vibrate the plastic mass over a zone of considerable width measured laterally from the longitudinal axis of the member 10. In operation, when the plastic mass 20 has been sufficiently vibrated at one location, the apparatus may be dragged or lifted to a new position longitudinally of the roadway or otherwise, and there allowed to operate for a suitable interval, and by successive movements of this kind, the entire area of the plastic mass may be consolidated and compacted.

In many pavement and foundation structures, fixed objects occur, such as the center joints 70, large rocks 72, or reinforcing rods 74. If the elements 12 were rigidly attached to the supporting member 10, such objects might be displaced from their desired positions or the vibrating apparatus might be damaged or caused to operate inefficiently. Therefore the vibrating elements are flexibly attached to the supporting member so that when objects are encountered, the vibrating elements may be easily deflected from their normal vertical positions.

In Figure 6, I have shown diagrammatically the action of the apparatus shown in Figures 2 and 3 as the wheels 34 roll along the side forms, rotating in the direction of the arrow 35. The crank pins 38 will travel in the arcs indicated by the arrows 39, resulting in the elements 12 successively assuming the dotted line positions illustrated.

This causes the elements to be withdrawn from the plastic mass 20 and reinserted at spaced points which are closed enough together, by proper designing of the circumference of the wheels 34, etc., that the range of vibration of the mass surrounding each element overlaps in the successive positions of the elements. Thus by merely rolling the carriage along the side forms, the vibrators are automatically inserted at equally spaced distances, instead of the spaces having to be measured or guessed at by lifting the apparatus of Figure 1 and then reinserting it manually.

Other means may be employed to secure the desired successive position of the vibrating elements, or the vibrating elements may be moved longitudinally of the roadway, remaining in the concrete at all times. The type of apparatus shown in Figure 10 is especially designed for operation by continuously moving the frame 32a along the roadway with the vibrating elements remaining continually in the concrete. The elements may be dragged along while partially inserted in the concrete.

Ordinarily the planer or screed 86 operates sufficiently to bring the surface of the concrete to the desired contour. When the concrete has an extremely non-flowing characteristic, however, the vibrating plate 94 can be used, which additionally agitates the concrete and causes all voids remaining after the vibrator elements have passed through, to be filled up.

Flexible tubing, springs, rubber rings and the like can be provided for supporting the vibrating elements 12, the types of supports I show being only by way of illustration. With respect to the vibrating mechanisms for the elements 12, they can be contained in the elements as disclosed, or the supporting members 10 or 10a can be vibrated for the purpose of vibrating all the elements 12 and without the necessity of providing each one with a vibrating mechanism.

Some variations may be followed in the practice of my method without departing from the real spirit and purpose of my invention. Accordingly, it is my intention to cover by my claims such use of equivalent method steps as may be reasonably included within their scope.

I claim as my invention:

1. In a road paving machine adapted to travel along a prepared roadway upon which has been distributed an unset and uncompacted concrete mixture, partially submerged tubular vibratory means inclined downwardly and rearwardly relative to the forward end of the machine and adapted to be advanced so that the submerged portion of said vibratory means is moved through the concrete with the forward movement of said machine.

2. In a road paving machine adapted to travel along a prepared roadway upon which has been distributed an unset concrete mixture, vibratory means adapted to be pulled through the unset concrete, and a crosswise strike-off bar rigidly attached to the carriage of said machine and adapted to roughly level off the top surface of the vibrating concrete mixture between said vibrating means and said strike-off bar.

3. In a road paving machine adapted to travel along a prepared roadway upon which has been distributed an unset concrete mixture, partly submergible tubular vibratory means inclined downwardly and rearwardly relative to the forward movement of the machine, and a crosswise, top-leveling strike-off bar rigidly attached to said carriage at a position rearwardly of the point of entry of the vibratory means into the concrete, and adapted to roughly level off the top surface of the vibrating concrete mixture between said vibrating means and said strike-off bar.

4. In a paving machine adapted to travel along a prepared roadway having transverse spacing and expansion members and upon which roadway has been distributed an unset and uncompacted concrete mixture, vibratory means adapted to be moved with the movement of the machine through the unset concrete, and means for withdrawing and re-inserting the vibratory means to avoid or skip the transverse spacing and expansion members across the roadway.

5. In a device of the kind described a frame adapted to travel over deposited material as along road forms, a plurality of spaced tubular vibratory members, transverse pivotal supports for attaching said members to the frame at their upper ends to permit the vibratory members to be deflected when an obstruction is encountered.

6. In a device of the kind described a frame adapted to travel over deposited material as along road forms, a plurality of spaced tubular vibratory members, transverse pivotal supports for attaching said members to the frame at their upper ends to permit the vibratory members to be deflected when an obstruction is encountered, and resisting means for dampening upward movement of the vibratory members and to yieldingly hold the vibratory members in contact with the material.

7. In an apparatus of the kind described a frame, supporting means for the frame whereby the frame may travel over the body of material, a vibratory element carried by the frame with its axis at an angle with the vertical and supported in position to be at least partially immersed in the material, said element containing an out-of-balance weight, means for imparting rotation to the weight about a line approximately parallel to the axis of the element for vibrating said element.

8. In an apparatus of the kind described a frame, supporting means for the frame whereby the frame may travel over a body of material, a vibratory element carried by the frame with its axis at an angle with the vertical and supported in position to be at least partially immersed in the material, said element containing an out-of-balance weight, means for imparting rotation to the weight about a line approximately parallel to the axis of the element for vibrating said element, and means interposed between the frame and the support for elevating and lowering the frame for thereby determining the elevation of the vibratory element.

ROBERT WILLIAM BAILY.